7372X
3 Sheets-Sheet 1.
S. H. Long,
Locomotive.
Patented Jan. 17, 1833.
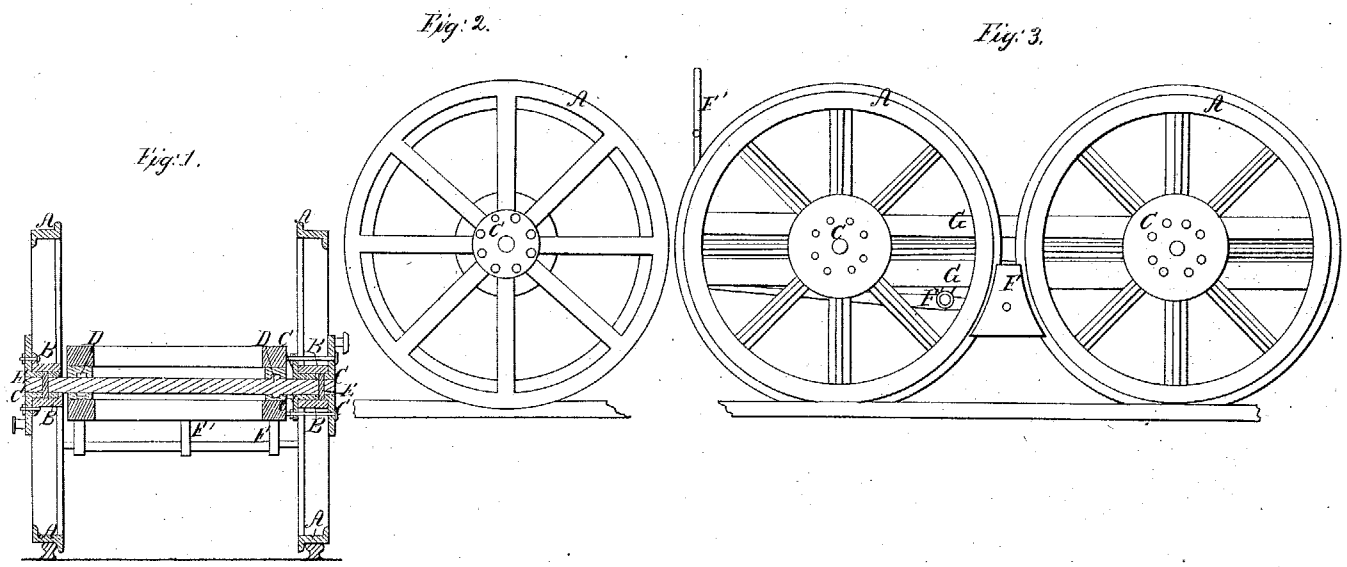
AM. PHOTO-LITHO. CO. N.Y. (OSBORNE'S PROCESS.)

7372X
3 Sheets-Sheet 3.
S. H. Long,
Locomotive.
Patented Jan. 17, 1833.
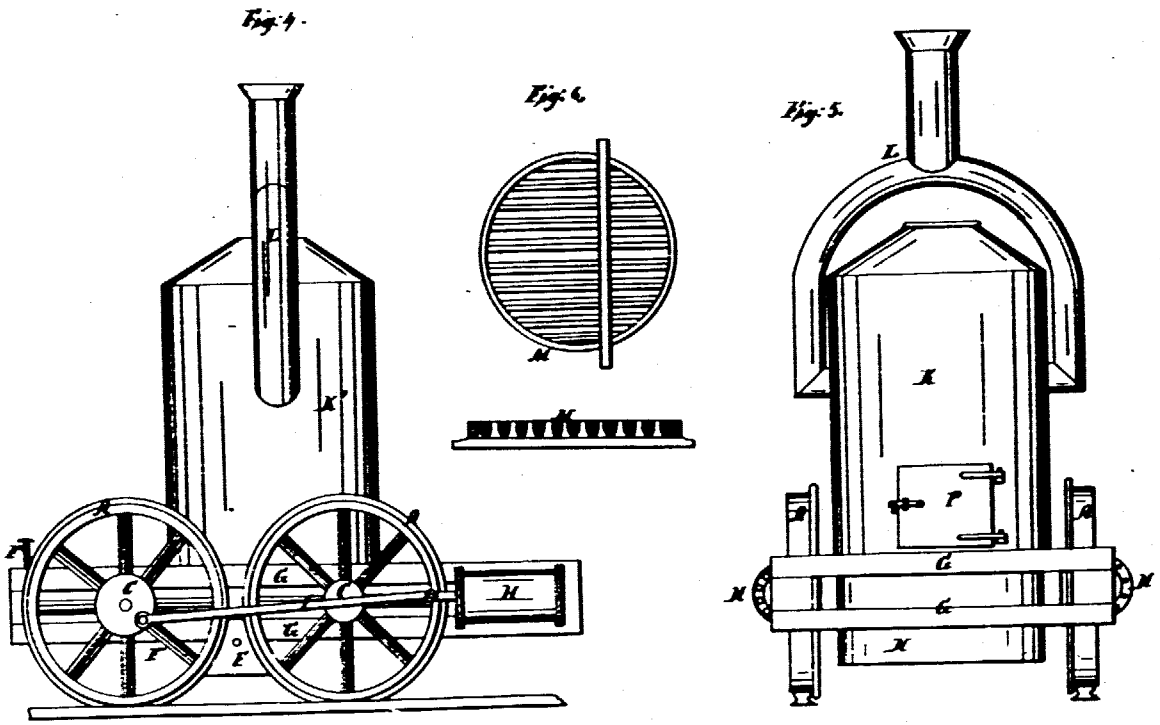
AM. PHOTO-LITHO. CO. N.Y. (SCHEMMINGER PROCESS)

No Printed Specification Available
7372X
3 Sheets-Sheet 3.
S. H. Long,
Locomotive.
Patented Jan. 17, 1833.
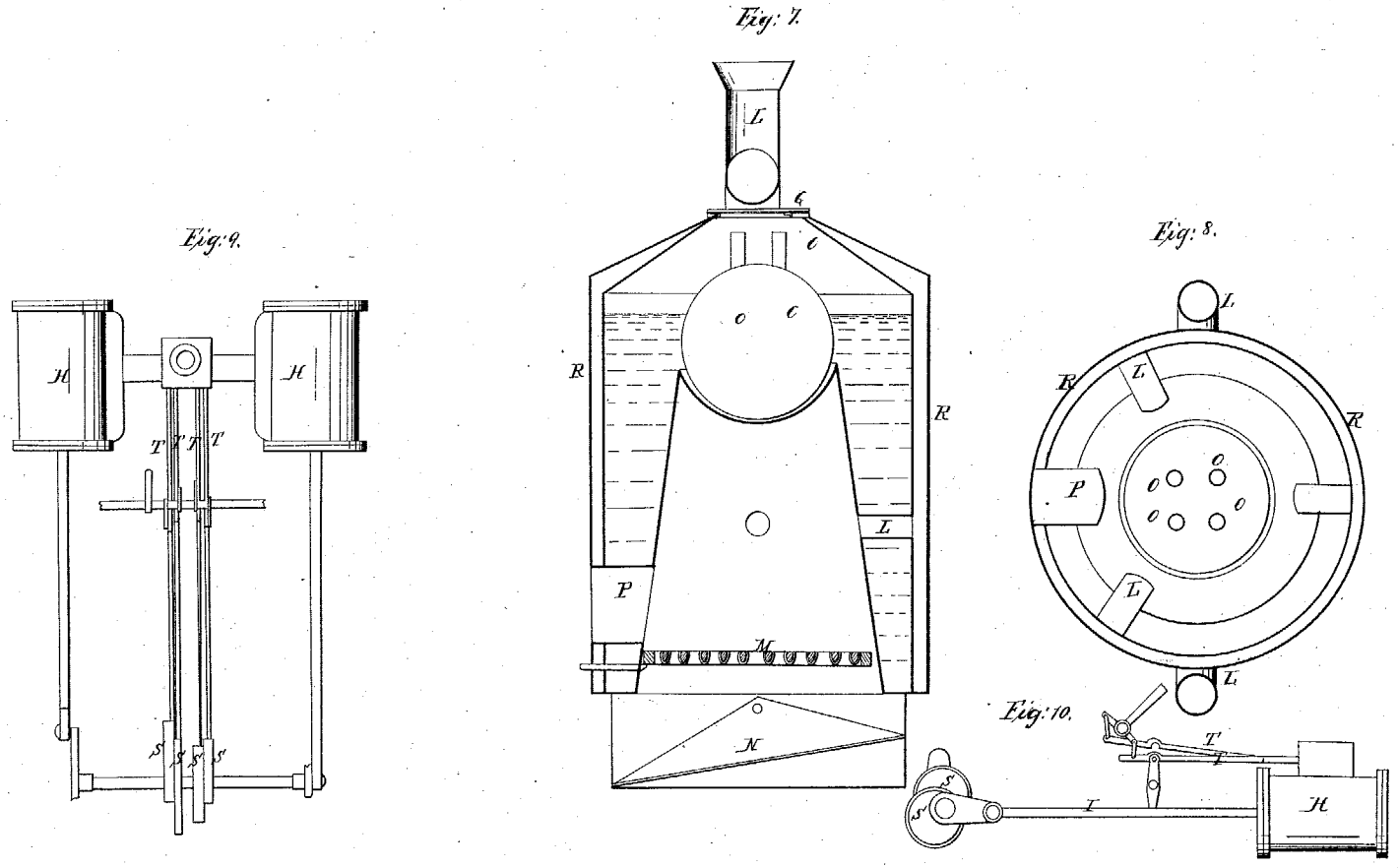
AM. PHOTO-LITHO. CO. N.Y. (OSBORNE'S PROCESS)

av. 12
Jan 17 1833 291

S. H. Long.
7372X

Letters Patent

The Schedule referred to in these Letters Patent and making part of the same containing a description in the words of the said S. H. Long himself of his improvement in the Locomotive Steam Engine & other Rail Road carriages The improvements here contemplated have for their object, greater economy and efficiency in the construction and use of Rail Road carriages generally and especially of carriages propelled by Steam on Rail Roads greater simplicity & compactness in the conformation & arrangement of their several parts and a more direct & less expensive application of motive Steam power than has hitherto been allowed in the construction of Machinery for similar purposes These improvements consist in the invention of new Machinery and parts of Machinery never before used in any way known to the applicant. of new modifications of machinery and parts of machinery before known but now for the first time introduced in the construc 1 tion of Rail Road Carriages and Locomotive Steam Engines and of a combination of machinery & parts of machinery which whether before known or unknown were never before used combinedly in Rail Road Carriages or Locomotive Steam Engines All which improvements are designated in this instrument in describing the "Pennsylvania Locomotive" a name adopted to designate the whole inventions modifications and combinations

What I claim as my improvement I have particularly specified as I have described the Machinery as used. — The Pennsylvania Locomotive as described in the following order viz, First the Wheels are constructed of Cast Iron in wheels of any convenient dimensions and containing such number of spokes as may be deemed advisable — The rim of the wheel is furnished with two flanges viz. one as usual projecting outward from the
tread or bearing surface of the wheel and serving as a guide to
keep the wheel upon the rail & the other believed to be new as
respects all carriage Wheels projecting inward on the opposite side
& form its [illegible] surface serving as a rib [illegible] to the [illegible]
of the rim & at the same time to the spokes with both of which
it is incorporated — The hub of the wheel is of a tubular form
of nearly the same thickness through as may be & that thick
ness being the same as nearly as may be with that of the other
parts of the Wheel. the equality and correspondence in thick
ness is believed also to be new as respects all carriage Wheels
and of a diameter large enough to receive boxes for the reception
of the axles. The hub may be furnished with one or more
flanges as may be deemed advisable viz. with one flange
projecting inward from its tubular periphery on the outside of
the hub — And with another projecting outward and inwar[d]
on the inside of the Wheel. The combination of these flanges is
believed by the applicant to be new.
In case of the hub being constructed without flanges two boxes
will be required for each hub viz a box entering the hub on
the outside. and a similar box entering it from the inside
of the Wheel. both of which boxes are to be furnished with flan
ges projecting beyond the exterior periphery of the hub & serv
ing for the reception of screw bolts which pass between the spokes
of the Wheel and firmly connect the flanges together. This
application of flanges to Boxes of carriage Wheels is believed by
the applicant to be entirely new — In case the hub is
furnished with flanges the size of the former may be enlarge[d]
at pleasure. both flanges must be perforated for the reception of
a box entering from the outside of the Wheel and penetrating thro'
the interior flange which last in its projection beyond the periphe
-ry of the hub will serve for the reception of [illegible] screw bolts which
in this modification will firmly connect the flange of the box
to the flange of the hub — In this case the flange of the box may be extended in a manner to subserve the purposes
of a crank which application of it, if made will as the appli
cant believes be entirely new — Flanges as stiffeners may be ad
ded to the spokes if required. This mode of constructing wheels for
Rail Road Cars is such that a degree of uniformity in the thick
ness of every part of the wheel may be successfully maintained —
whereby the strain or stress usually left upon wheels either in the
unequal crystalization and cooling of the metal or in the ordi
nary mode of binding & wedging of the hubs when cast in seg=
ments may be readily obviated without impairing the strength
of the wheel or rendering its construction more expensive. Second
the axles and their adjustments are of a character differing from
those of ordinary Rail Road Cars. and are believed to be new,
as regards Carriages & machinery in the following particulars
The axles are of a uniform size or nearly so throughout their
entire length. no journals necks or shoulders or other irreg=
ularities being necessary in this construction. They are firm
ly connected to the wheels by means of linch pins of a suitable size
passing thro' their extremities and thro' those parts of the sockets
or boxes that are inserted within the hubs so that the hubs
effectually prevent the linch pins from dropping out of their
places (The usual wedge pins may be added at the pleasure
of the constructor) Instead of journals or necks turning in
steps or bearings in the usual manner bands or rings are substitu
ted with or without washers on either or on both sides of the band
which together with the washers when applied are placed within
a groove or cavity in the steps or bearings which not only serve
as a receptacle for the band and washer but also as a
reservoir for grease or oil for lubricating the axles
The ring or band is firmly attached to the axle by means of two
or three pins or taps of suitable size passing thro' its periphery
& penetrating the axle to the depth of about one quarter of an inch
& in a direction towards the centre of the ring — The exterior box

[illegible] of the Wheels when applied to Locomotive Engines are supplied
with flanges prolonged in such a manner as to subserve the pur-
pose of cranks. or a substitute for cranks may be found at the pleas-
ure of the artificer in applying a receptacle for the crank wrist
to one or more of the spokes as heretofore practised - Third. Brakes
or convoys may be applied to the wheels in the following manner.
Between the foremost and hindmost Wheels on either or both sides
of the four wheel cars may be placed a brake of a triangular form
or of the form of a wedge truncated at its point with sides lon-
gitudinally concave which is made to act on the peripheries of
the two collateral wheels either by being thrust upwards or down-
wards till its concave sides come into contact with the peripheries
or rims of the Wheels on which they are intended respectively to op-
erate - The position of the Brake or Brakes may be either above
or below a line passing horizontally thro' the centres of the Wheels wedg-
ing or thrusting upward. in the latter case and downward in
the former - The brake may be made to perform its office by
means of a lever Screw or Pulleys at the option of the constructor
This mode of employing brakes or convoys is believed to be entire-
ly new - Fourth. The boiler is of a cylindrical form
standing on end and terminated at its upper extremity by the frus-
tum of a direct cone. the summit of the frustum affording
an area sufficient for the manhole thro' which the boiler may
be entered at its top - The inside of the boiler presents also
the frustum of a direct cone the interior of which serves as a
fire place. this form of construction of the boiler is new and
was invented by me but was published in the Franklin Journal
in 1827. - The frustum in this case instead of being termina-
ted at the top by a plane area contains a basin of a hemispherical
shape + presenting its concavity towards the fire place - The diam-
eter of the fire place at the base of this frustum is three to four
inches less than that of the external part of the boiler and at the
summit of the frustum three or four inches less than that of its base

[illegible]

Within the basin above mentioned are placed four quadrantal vessels these vessels when combined constitute a hemispherical steam chamber within the basin of a diameter three to four inches less than that of the basin or of the top of the frustrum in which the basin is situate. Each vessel is furnished with a tube or opening rising considerably above the extreme height of water of the boiler & communicating with the steam chamber at the top & within the conical head of the boiler. The whole of this arrangement of quadrantal chambers is believed to be entirely new. The boiler is perforated by circular openings leading from the fire place thro' the sides of the boiler. The largest side of these openings which is about ten inches in diameter serves as a fire door for the admission of fuel to the fire place and at the same time as a flue in conjunction with the other openings to convey the heated air smoke &c from the fire place. The boiler is surrounded by a double casing of sheet iron serving as a flue to conduct the heated air &c from the flues just before mentioned around the exterior of the boiler. The heated air is conveyed thro' the casing of the boiler by means of two other flues passing outward from opposite sides of the Boiler and then upward on the outside of the casing to the top of the boiler where they unite and pass upward in a single flue or chimney. Near the points at which the two flues last mentioned pass from the boiler casing are tubular swivel joints by means of which the flues and chimney may be thrown into a vertical or oblique position as occasion may require either to increase the draught thro' the fire place or to pass under a bridge or thro' a tunnel, when used in a carriage. This method of construction of flues or chimneys by means of the tubular swivel joints is believed to be entirely new. The fire grate is within the conical frustum of the boiler at its lower extremity and is constructed of wrought iron plates about one fourth of an inch thick. The grate bars are attached to a wrought iron ring of about the same thickness. The bars and the ring have nearly a uniform depth of about four inches. The bars are formed of plates of a width about

7372-X double the depth of the grate the plates being folded longitudinally in such a manner as to form bars respectively about half an inch thick on their lowermost & one and a half inch thick on their uppermost edges and having a vacant space of a prismatic form in the body of each bar. This cavity is filled with fire clay or other suitable nonconductor of heat. This method of constructing grates is believed to be new.

The grate is made to traverse on a bolt or axle situated beneath the grate passing transversely across the bars and occupying a position about one third part of the diameter of the grate either from its front or rear on the side most remote from the axle. The grate is sustained by a bolt passing under that side & capable of being withdrawn at pleasure whenever it becomes necessary to discharge the fuel from the fire place.

The withdrawing of the bolt being succeeded by a prepondsserance of that part of the grate which was sustained by it & the consequent turning of the grate upon its axle which precipitates the fuel from the fire place.—

The ash pit is provided with an inclined flooring or apron of sheet iron the front & rear of which may be respectively elevated or depressed at pleasure not only for the purpose of regulating the draughts into the fire place but to prevent its becoming overcharged with ashes cinders &c. the inclination serving to facilitate the discharge of any substances that may fall from the grate — either or both of the bolts by which the apron is sustained may be withdrawn whenever it becomes necessary to discharge the contents of the fire place and the apron entirely removed from the ash pit. This arrangement is believed to be new—

Fifth. The working or steam Cylinders of which there are two are placed horizontally within the body of the carriage & communicate their action reciprocally in lines parallel to the sides of the carriage frame. Their Centres are elevated about four inches above the centres of the carriage wheels they receive the steam from the boiler through a single steam chest which is furnished with two slide valves viz. one for each cylinder, the movements of which are regulated in a manner to cut off or intercept the steam in its passage into each cylinder at about one half the stroke of the piston— The application of two horizontal Cylinders & their reciption of the steam thro' a single steam chest are believed to be new.
Sixth. The apparatus by which the valves are moved consists of a com-
pound Cam & four Cam rods operating in such a manner that the wheels
of the carriage may be made to revolve in either direction at pleasure by
throwing two of the Cam Rods into gear & the other two out of gear. The
compound cam is attached to one of the carriage axles and consists of
four simple cams combined in such a manner as to contribute to the
operation above mentioned. which is effected by arranging the wipers
or working parts of each cam about ninety degrees in advance of the cor-
responding parts of the cam that operates in conjunction with it and
by a similar arrangement in relation to the reverse cams. The cam rods
are thrown into gear and out of gear by means of a compound crank &
winch together with small levers connecting the cam rods respective-
ly with the compound cranks. which winch and crank being turned
to one extreme of their range brings into action one pair of the rods &
relieves the other pair and vice versa when the crank and winch are turn-
ed to the opposite extreme & when they are turned to a point midway
of their range both pairs of rods are thrown out of gear & the steam valves
are entirely disengaged from them & may be moved by hand as occasion
may require — This mode of adjustment of the cams and cam rods is
believed to be entirely new — Seventh — The carriage frame consists
of four chuck pieces Viz. Two on each side of the carriage one above & the
other below the axles connected by transoms or cross timbers which serve not
only to connect the chuck pieces. but to sustain the Cylinders. boiler. bell cranks
& other parts of the machinery — The frame is suitably braced and stiff-
ened by the pedestal on which the boiler rests by the timbers composing the
bed of the cylinders & by diagonal stays of iron contributing to produce stiff-
ness not only in the horizontal but in the vertical connexions of the frame
or body of the carriage — The entire carriage and machinery except
the wheels & axles & the parts immediately connected with the latter are sustained
on springs by means of small iron stirrups attached to the lower string
pieces or chucks and depending from the extremities of the springs.
The connexion of the wheels & axles with the carriage frame in a X direction longitudinal of the latter is effected by means of two iron bars
situated about midway between the upper & lower string pieces one on each
side of the carriage connected with the brass bearings or steps in which
the axles turn. The cheeks transoms &c are constructed of oak
or oak scantling about four inches square. The bolts rods &c
by which they are connected are about three fourths of an inch in
diameter. The relative disposition of the connecting bars the axles
& the steam cylinders together with their several adjustments are believed
to be new. Eighth. The safety valve is constructed in conformity
to a principle devised and recommended by Charles Wetherill Esq of Phil-
adelphia & I claim as my invention the application and mode of con-
struction of the apparatus by which the principle is applied. It has
for its object the prevention of a counter current of steam from acting upon
the superior surface of the valve and thus contributing to press the
valve downward in a manner to prevent the salutary operation of
this important appendage of the steam engine. My manner of
applying this principle to Locomotive and other steam engines is
as follows viz. ... A valve chamber of a circular form & of a size suf-
ficiently large to contain the valve and its seat & to admit the free pas-
sage of steam on all sides of the valve is made of cast iron or brass &
attached either to the boiler or to a steam tube leading from it.
On one side of the chamber is an aperture leading from it at a point
about equal in height to that of the valve seat, which last is elevated about
two & a half inches above the bottom of the chamber & occupies the
summit of a cylindrical tube rising to that elevation within the cham-
ber. The valve chamber is furnished with a cap or bonnet care-
fully adjusted to its top and perforated for the reception of the valve
which is of a cylindrical form having a diameter equal to that of the
aperture in the valve seat. The bonnet is furnished with a stuffing
box and follower by means of which the valve may be made to pass
steam tight or nearly so thro' the cap of the chamber. The valve
is also perforated from its top longitudinally to within about half an
inch of the part resting on the valve seat for the reception of a small iron

153

Rod or stem which serves to communicate the action of the weight to the
valve – The diameter of this perforation is somewhat greater than that of
the stem in order to prevent the latter from impinging against the
sides of the valve & thereby causing the friction in the movements of the
latter the valve has also a stem thrusting downwards thro' the valve
seat and entering a guide situated at the bottom of the tube on which
the valve rests. as is usual in reference to ordinary safety valves. By
means of this arrangement the waste steam instead of passing upward
by the sides & [illegible] upon the upper surface of the valve is made
to enter the Chamber by raising the valve and afterwards to pass out
at the aperture in the side of the chamber. situated as before mention
ed at or below the valve seat – Ninth – In accordance with a
principle devised and successfully tested by Messrs J P Witherill & Co
of Philadelphia which recognizes the utility and advantage of injecting
a current of steam into ignited anthracite coal as a means of promo
ting combustion increasing inflammation & consequently of diffusing
more effectually the heat generated from anthracite and perhaps other
coal – I have adopted a plan of introducing a current of steam which
is discharged from the cylinder or from the safety valve immediately
beneath the furnace of the boiler of Locomotive & other steam engines
I claim only the application of this principle to Locomotive Engines
This object I effect in the following manner viz. the ejection steam
tube leading from the cylinders communicates not only with the escape
or waste pipe but with a pipe leading directly to the furnace. the
pipe last mentioned being furnished with a cock to regulate
the quantity of steam to be injected into the furnace.
Between the cock & the furnace the steam may be conveyed thro
any number of tubes that may be deemed advisable. & injected into
the furnace thro' an equal or greater number of apertures.
The steam tube leading from the safety valve has also a similar
connection with the escape pipe & the tube leading from the
furnace – (Note.) The Messrs Witherills have granted to
the petitioner the privilege of applying the principles discovered

7372 X by them as recognized in the Eighth and ninth articles of the foregoing specification to the Locomotive and other steam engines Tenth. A water tank of the capacity of about three barrels is attached to the Locomotive beneath the cylinder and Bell crankes Witnesses Tracy Taylor
Geo. McClellan
A. D. Pond S. H. Long.

4000 Wds

Ex. No. 24 W.